Figure 1:
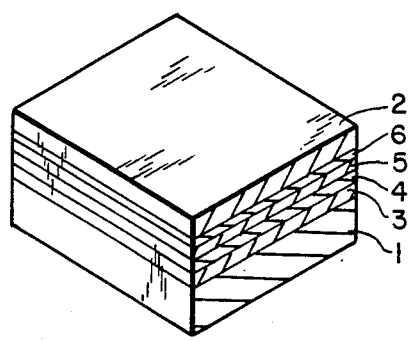

United States Patent [19]

Bronnes et al.

[11] Patent Number: 4,643,347

[45] Date of Patent: Feb. 17, 1987

[54] MOUNTING HARD MAGNETIC MATERIAL PERMANENT MAGNETS

[75] Inventors: Robert L. Bronnes, Irvington; Richard C. Sweet, N. Tarrytown, both of N.Y.; James K. McKinlay, Ridgefield, Conn.

[73] Assignee: North American Philips Corporation, New York, N.Y.

[21] Appl. No.: 659,066

[22] Filed: Oct. 9, 1984

[51] Int. Cl.⁴ .............................................. B23K 31/02
[52] U.S. Cl. .................................... 228/208; 228/209; 228/210; 228/263.13
[58] Field of Search ........... 228/208, 209, 210, 263.13; 29/607

[56] References Cited

U.S. PATENT DOCUMENTS 3,395,443  8/1968  Polinko .............................. 228/208
3,923,232  12/1975  Houska et al. ................. 228/263.13

FOREIGN PATENT DOCUMENTS 999818  7/1965  United Kingdom .

Primary Examiner—Nicholas P. Godici
Assistant Examiner—Karen Skillman
Attorney, Agent, or Firm—Paul R. Miller

[57] ABSTRACT

A permanent magnet of a hard magnetic material, such as rare earth-cobalt intermetallic compounds or Al-NiCo, is joined to a mounting surface by way of intermediate layers. These layers avoid heating the magnet above the maximum service temperature of the magnetic material, and thus prevent losing the magnetic properties.

13 Claims, 2 Drawing Figures

MOUNTING HARD MAGNETIC MATERIAL PERMANENT MAGNETS

The present invention is directed to improved techniques for mounting permanent magnets. In particular, the present invention involves mounting a permanent magnet of a hard magnetic material having a high magnetization energy to produce, in which the magnet is joined to a mounting surface through at least one metal layer, together with a joining layer.

Permanent magnets with high energy products, i.e. maximum B.H, such as the rare earth-cobalt intermetallic compounds or AlNiCo, are not solderable by conventional methods because no metallurgical bond is formed between the magnet and solder. Positioning of such magnets in a fixed location requires the use of organic adhesives which have been found to deteriorate, lose their adhesive strength, and even produce deleterious organic vapors.

Also the mounting of magnets onto mounting surfaces has incurred various difficulties, depending upon the type of magnet and the type of joining materials. For example, soft magnetic materials, such as ferric and ferrous magnetized materials, have been mounted by way of joining the magnet to a support with metallized layers at high temperatures above the Curie temperature of the magnet. An example of this may be seen in U.S. Pat. No. 3,793,705 in which a nickel-zinc type ferrite ceramic is brazed to a metal member by way of a silver type brazing alloy. This high temperature brazing uses temperatures in the range of 600° C. to 1000° C. A difficulty with such high temperatures is loss of magnetization and the necessity to remagnetize if possible.

The British Pat. No. 999,818 also involves ferromagnetic transducers joined together at relatively high temperatures. Although the reference discusses temperatures lower than 400° C., it is directed to joining ferromagnetic materials to each other by way of various layers of metal of a first thickness joined by a thicker layer of another metal. This reference while recognizing the problem of loss of magnetic properties does not solve the problem especially for hard magnetic materials.

Other types of joining techniques utilize organic materials in which an organic adhesive material, such as an epoxy, wets the surface of the magnetic material. One difficulty with using organics is possible outgassing of volatile condensible materials. Also attempts to directly solder surfaces require surface preparation by use of strong fluxes which may damage magnetic materials.

Finally, it must be noted that all normal joining techniques for joining metals are not applicable for magnetic materials because of the loss of magnetic properties. This means that reducing atmospheres cannot always be used with magnetic materials because of irreversible chemical or metallurgical changes that may occur at elevated temperatures. Moreover, the bonding of magnetic materials to other materials at temperatures higher than the maximum service temperature will result in irreversible changes in the magnetic structure which can be recovered by remagnetization after returning to room temperature, and may result in irreversible changes related to metallurgical or chemical changes which are not recovered by remagnetization.

The present invention involves a technique for joining magnetic materials to a mounting surface without incurring the problems of the prior art.

In particular, the present invention involves bonding of magnetic materials to a metal mounting surface without loss of magnetization. That is, permanent magnets of a hard magnetic material can be joined to a mounting surface without heating the magnet above the maximum service temperature above which irreversible magnetic losses or material changes occur. These permanent magnets of hard magnetic material are materials of rare earth cobalts or AlNiCo which are joined to metal surfaces without destroying the magnetic properties of such permanent magnets.

Figure 2:
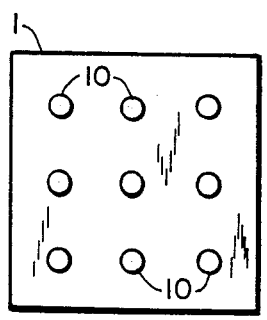

These and other objects and improvements of the present invention may be seen by reference to the drawing figures which show without limitation the features of the invention, and wherein FIG. 1 illustrates the joining of permanent magnets to a mounting surface according to the present invention, and FIG. 2 illustrates an example of mounting magnets according to the present invention.

The joining of hard magnetic materials, as for example those requiring a large amount of energy, may be accomplished according to the present invention wherein a magnet 1 is joined to a mounting surface 2 by deposition of several layers of material. In the example illustrated in FIG. 1, a samarium-cobalt ($Sm_xCo_y$) magnet can be joined to a metal mounting surface 2 of brass, for example, by way of interposing several layers 3, 4, 5, 6.

Thus, a first layer 3 of a material, such as titanium, may be deposited to the magnet 1, and thereafter, a barrier layer 4 for the titanium may be applied. This barrier layer 4 may be a nickel layer, a layer of nickel-copper alloy, such as Monel, or a layer of a nickel-iron-cobalt alloy, such as Kovar. Finally, a solderable layer 5, such as copper, nickel, and gold, may be applied over the barrier layer. This solderable layer 5 can be soldered to the mounting surface 2 which may be of brass or other suitable metal.

These metal layers may be deposited by various techniques, including sputtering, such as diode sputtering, for example.

A solder layer 6 is shown between the solderable layer 5 and mounting surface 2 in FIG. 1. The solder layer 6 may be typically a tin-lead solder, an indium-base alloy, or a bismuth-base alloy, for example.

Alternatively, a brazing layer of silver-copper might be considered, but brazing ordinarily causes loss of magnetization because of the temperatures involved.

A magnet made according to the present invention can be used as pole pieces in motors. Such magnets may be carried on a rotating or reciprocating shaft, and carried where the positions of magnetic surfaces must be accurately controlled.

The magnet may be fixed into place, for example, by way of dots, such as seen in FIG. 2. These dots 10 are the connecting portions to a metal surface, such as described in FIG. 1. The various dots 10 represent the fixing positions of the magnet 1 to a mounting support, such as the mounting surface 2 in FIG. 1.

The dot pattern illustrates a type of discontinuous bonding of surfaces which may be important in certain applications wherein the elimination of electrical current carrying sheets is necessary. Alternatively, the dot pattern may be desirable in certain low temperature applications wherein large differences of coefficients of expansion may have to be accommodated.

In the arrangement of the present invention, the permanent magnet is a hard magnetic material such as, for example, samarium cobalt ($Sm_xCo_y$). These magnetic materials have maximum service temperatures of the order of 250° C., and the joining of the magnet to the mounting surface is performed in all cases below this temperature. Irreversible loss of magnetic properties may occur at temperatures higher than this temperature.

Samarium cobalt magnets are difficult magnetic materials to bond to mounting surfaces. Prior art uses of organic materials to bond samarium cobalt has resulted in difficulties by outgassing, and surfaces prepared with strong fluxes which may damage the surfaces. Moreover, the samarium cobalt magnet cannot be directly soldered to a mounting surface.

Samarium cobalt is a magnetic material needing a large amount of energy to magnetize. For example, the energy product used to magnetize samarium cobalt involves 20-23,000 Gauss. AlNiCo, also being a magnetic material for use in the present invention, has a magnetization energy above 16,000 Gauss. These materials are hard magnet materials requiring a considerable energy to magnetize which is substantially above that of ordinary ferromagnetic materials to be magnetized. Ferromagnetic materials are magnetized at energies much below 8,000 Gauss.

In the arrangement of the present invention, the selection of the layers used to mount the magnet to the mounting surface all involve thicknesses of 1 to 2 microns.

While several embodiments have been discussed, these do not limit the scope of the present invention which is set forth in the accompanying claims.

What is claimed is:

1. A method for mounting permanent magnets to a mounting surface comprising
   sputtering at least one layer of a metal on a permanent magnet of a hard magnetic material,
   forming a joining layer on at least parts of said metal layer, and
   soldering or brazing a mounting surface onto said joining layer.
2. A method for mounting permanent magnets as claimed in claim 1, wherein said metal layer includes at least three different layers.
3. Method for mounting permanent magnets as claimed in claim 2, wherein said three layers include a first layer of titanium, a second layer of nickel or a nickel alloy, and a third layer of copper.
4. Method for mounting permanent magnets as claimed in claim 3, wherein said joining layer includes a tin-lead material or silver-copper material.
5. Method for mounting permanent magnets as claimed in claim 4, wherein said mounting surface is brass.
6. A method for mounting permanent magnets as claimed in claim 1, wherein said permanent magnet is a rare earth-cobalt intermetallic compound or an aluminum-nickel-cobalt (AlNiCo) compound.
7. A method for mounting permanent magnets as claimed in claim 6, wherein said permanent magnet is $Sm_xCo_y$.
8. A method for mounting permanent magnets as claimed in claim 6, wherein said permanent magnet has a maximum service temperature of the order of 250° C.
9. A method for mounting permanent magnets as claimed in claim 1, wherein said metal layer is titanium.
10. Method for mounting permanent magnets as claimed in claim 1, wherein said joining layer includes a tin-lead material or silver-copper material.
11. Method for mounting permanent magnets as claimed in claim 1, wherein said mounting surface is brass.
12. A method for mounting permanent magnets as claimed in claim 1, wherein said permanent magnet is $Sm_xCo_y$.
13. A method for mounting permanent magnets as claimed in claim 1, wherein said permanent magnet has a maximum service temperature of the order of 250° C.

* * * * *